United States Patent [19]

Kirkby

[11] Patent Number: 5,083,233
[45] Date of Patent: Jan. 21, 1992

[54] SURGE PROTECTION ASSEMBLY FOR INSULATING FLANGES

[76] Inventor: Peter Kirkby, 88 Royal Avon Crescent, Islington, Ontario, Canada, M9A 2G1

[21] Appl. No.: 517,021

[22] Filed: May 1, 1990

[51] Int. Cl.⁵ .............................. H02H 9/06
[52] U.S. Cl. .................... 361/117; 361/126
[58] Field of Search .......... 361/117, 118, 119, 126, 361/127

[56] References Cited

U.S. PATENT DOCUMENTS

| | | | |
|---|---|---|---|
| 2,761,979 | 4/1953 | Wilson | 361/117 |
| 2,907,910 | 10/1959 | Marsteller | 361/126 |
| 2,959,692 | 11/1960 | Marx | 361/127 |
| 4,100,588 | 7/1978 | Kresge | 361/127 |
| 4,161,012 | 7/1979 | Cunningham | 361/127 |
| 4,987,511 | 1/1991 | Hopkinson et al. | 361/126 |

FOREIGN PATENT DOCUMENTS 255440 10/1989 Japan ............................ 361/126

OTHER PUBLICATIONS

Techniques for the Protection of Gas-Insulated Substation to Cable Interfaces by N. Fujimoto, S. J. Croall and S. M. Foty, IEEE Trans Power Delivery, vol. 3, No. 4, Oct. 1988, pp. 1650–1655.

Primary Examiner—Geoffrey S. Evans
Attorney, Agent, or Firm—Ridout & Maybee

[57] ABSTRACT

A protective device for an insulating flange of a high voltage transmission system comprises a varistor unit in combination with a spark gap. The varistor unit is clamped between a pair of radially extending stub plates connecting the unit in shunt with the insulating flange. The spark gap is defined by a pair of spark electrodes mounted on the stub plates radially outwardly of the varistor unit so that the latter shields the insulating flange from molten metal and heat generated at the spark gap should the varistor unit fail.

11 Claims, 7 Drawing Sheets

SURGE PROTECTION ASSEMBLY FOR INSULATING FLANGES

Field of the Invention

This invention relates to protective assemblies to be used in high voltage power transmission systems for the surge protection of insulating flanges installed therein. Insulating flanges are commonly used in high voltage cable systems at the interfaces between independently grounded sheath components such as the high voltage conductor enclosures. For example, insulating flanges are commonly used on transmission systems to isolate the metal pipe of a high pressure oil-filled (HPOF) cable from the independently grounded enclosure of a gas-insulated substation (GIS). This permits cathodic protection to be applied to the metal pipe of the cable. The assemblies provide protection to a region where pressurized gas and liquid are used for insulation of conductors in high voltage power transmission systems.

Transient overvoltages which occur from lightning, switching or from faults can cause damage to unprotected insulating flanges used in such systems, resulting in power outages and damage to equipment. It is an object of the present invention to provide an improved protection for such flanges.

SUMMARY OF THE INVENTION

According to the present invention, there is provided, in combination with an insulating flange of a high voltage power transmission system wherein the insulating flange is sandwiched between a pair of independently grounded metal flanges, a surge protection device comprising at least one pair of metal stub plates rigidly attached to the metal flanges and extending radially therefrom in opposed relation to one another, a metal oxide varistor clamped between the stub plates in shunt with the insulating flange, the varistor having a breakdown voltage lower than the breakdown voltage of the insulating flange, and means defining an adjustable spark gap in shunt with the varistor assembly, the spark gap being adjusted to have a breakdown voltage higher than the varistor breakdown voltage but lower than the breakdown voltage of the insulating flange thereby to protect the insulating flange from transient surges should the varistor fail.

Preferably the spark gap defining means are positioned radially outwardly from the varistor in radial alignment with it, whereby the varistor shields the insulating flange from arcing by-products such as heat and molten metal which may be generated at the spark gap.

The varistor may be encapsulated to protect it against moisture or other environmental effects.

BRIEF DESCRIPTION OF THE DRAWINGS

Exemplary embodiments of the invention will now be described with reference to the accompanying drawings, in which.

DESCRIPTION OF THE INVENTION—BACKGROUND

Figure 1:
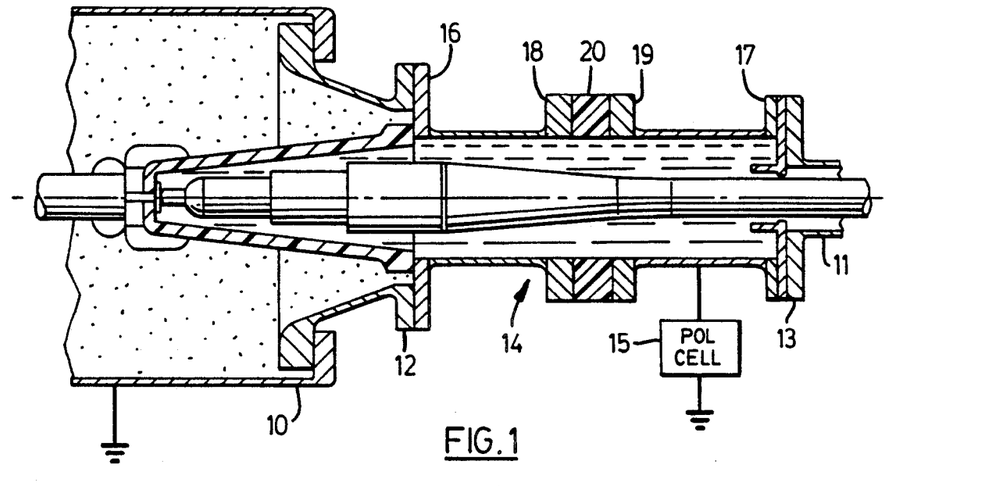
FIG. 1 is a schematic sectional view illustrating the location of an insulating flange at the interface between a GIS enclosure and an HPOF cable.

FIG. 1 illustrates a typical arrangement at the interface between a gas insulated substation (GIS) having a metal enclosure 10 and a high pressure oil-filled cable (HPOF) having a metal pipe-type casing 11. The enclosure 10 and the casing 11 have terminal flanges 12, 13, respectively, which are interconnected by a flanged connector assembly 14.

The enclosure 10 and the pipe-type casing 11 of the cable are independently grounded, the casing 11 being connected to ground via a polarization cell 15 used in the cathodic protection of the cable casing. The connector assembly 14 comprises a pair of flanged metal cylinders having respective end flanges 16, 17 connected to the respective flanges 12, 13 of the GIS enclosure and the cable casing. The flanged metal connectors also have respective opposed flanges 18, 19 which are bolted together but electrically isolated from one another by an insulating flange 20 sandwiched between the flanges 18 and 19. The insulating flange is designed to withstand voltages which may develop across it under normal conditions, but is liable to break down in the event of transient overvoltages.

Figure 2:
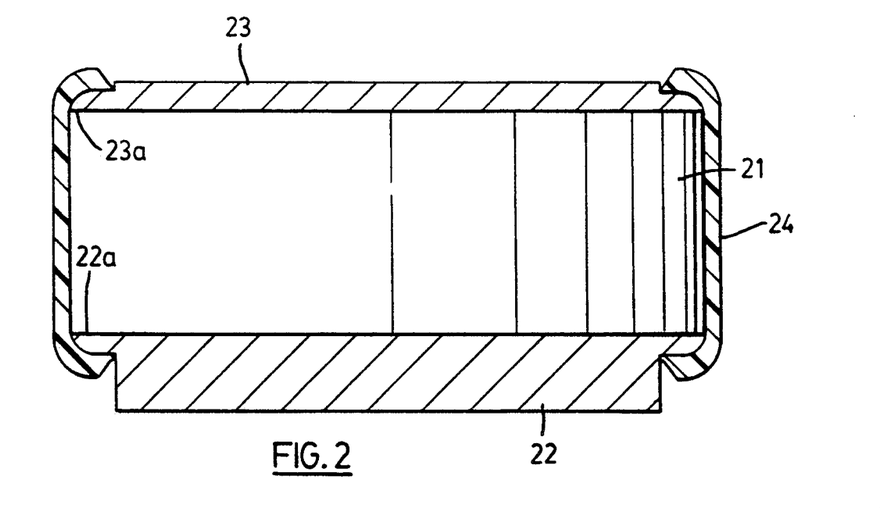
FIG. 2 is a sectional view of a metal oxide varistor device to be used in the protective assemblies of the invention.

The present invention makes use of a metal oxide varistor to protect the insulating flange 20 from transient overvoltages. A varistor is a highly non-linear ohmic resistor which limits voltages surges and dissipates the resulting energy. A preferred varistor device developed for this invention is illustrated in FIG. 2. A discoid metal oxide varistor element 21 having the following characteristics was selected:

| | |
|---|---|
| Maximum Continuous Operating Voltage | 3.45 kV (peak) |
| Voltage Rating | 4.14 kV (peak) |
| Energy/Voltage Rating | 7 kJ/kV(rms) |
| Diameter | 64 mm |
| Height | 22 mm |

As shown in FIG. 2 the varistor element 21 is sandwiched between a pair of machined copper discs 22, 23 each having a peripheral flange 22a, 23a. The assembly is encapsulated and held tightly together by an annular sheath 24 of heat-shrinkable plastic, the ends of which are inturned to engage the flanges 22a, 23a.

Figure 3:
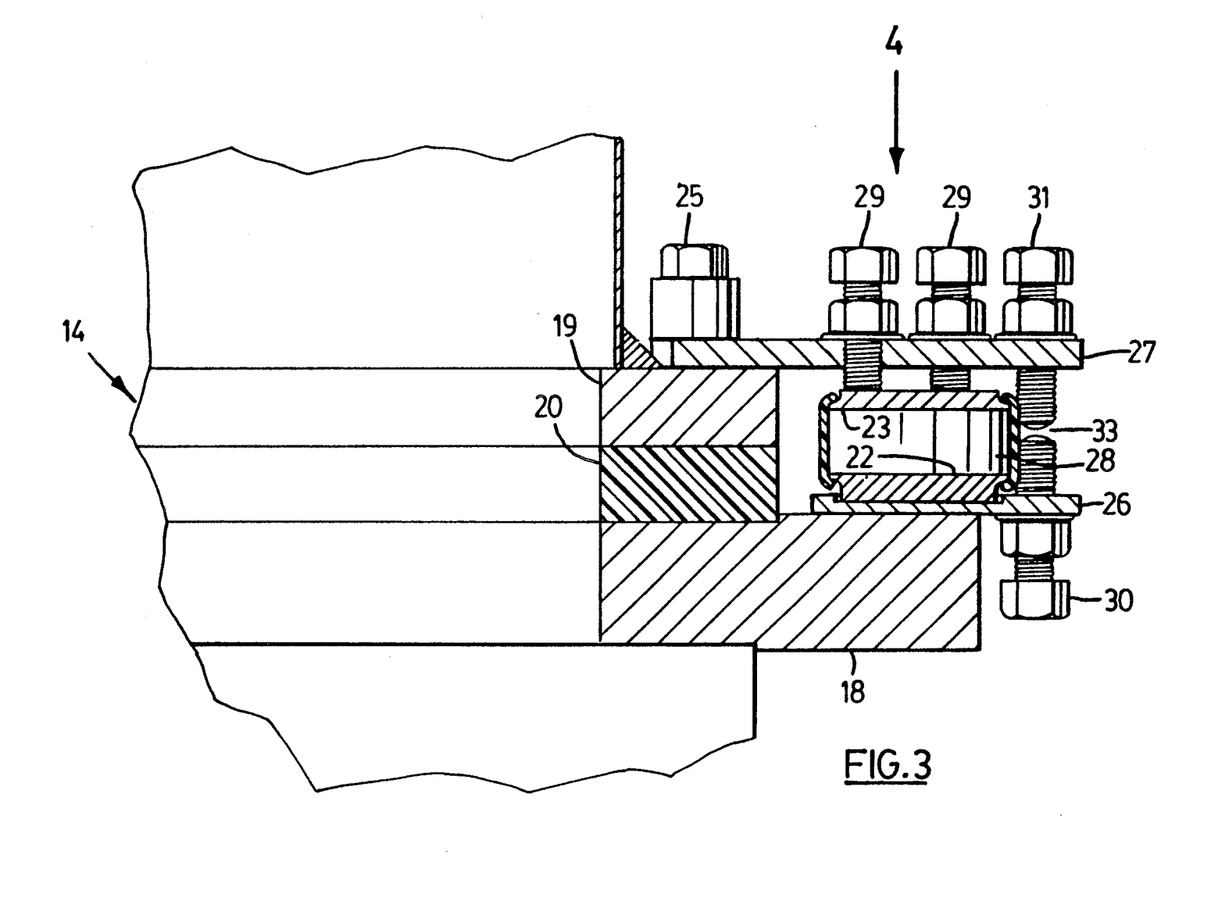
FIG. 3 is a sectional elevational view of a first protective assembly employing the varistor of FIG. 2 in conjunction with a spark gap.
Figure 4:
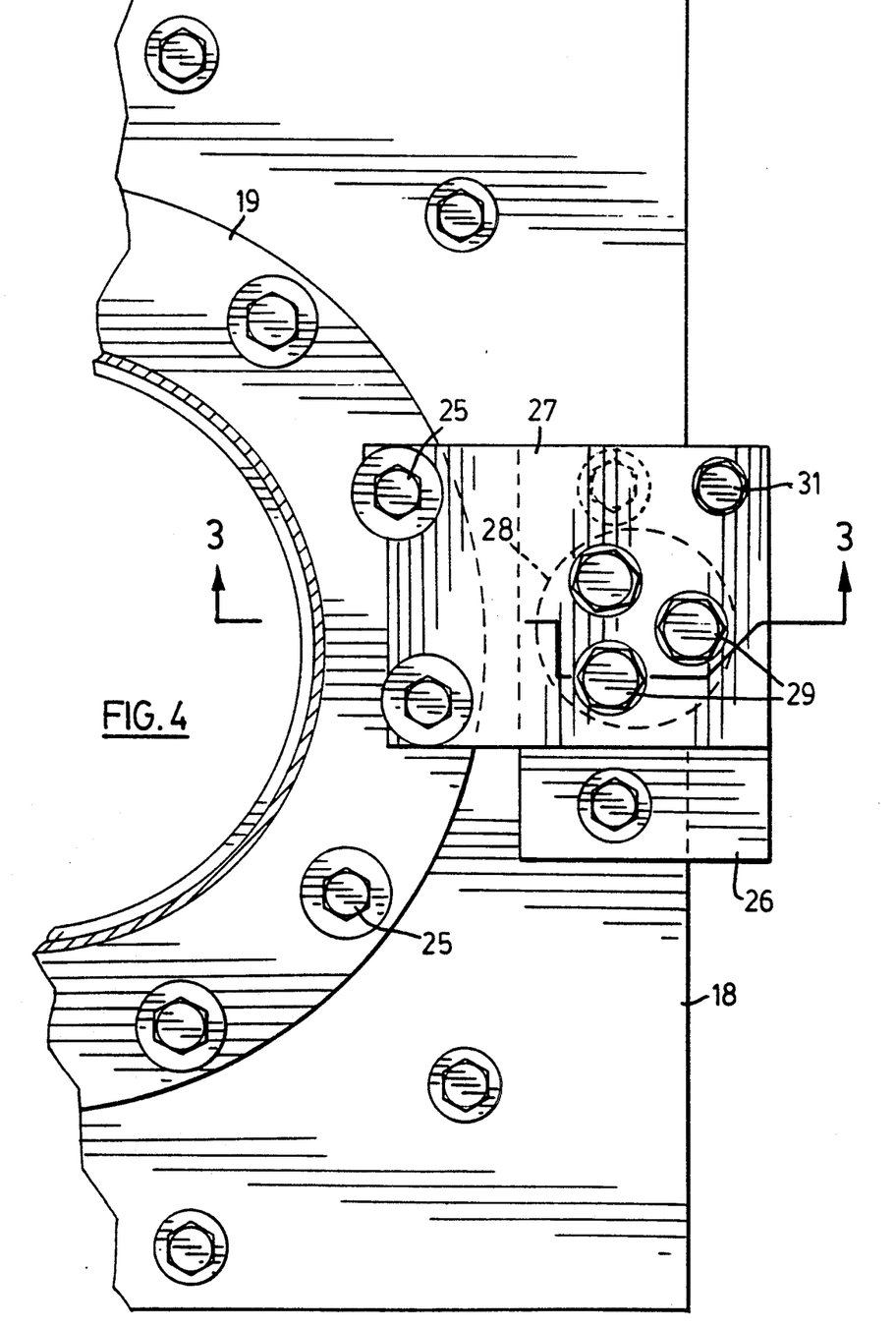
FIG. 4 is a top plan view of FIG. 3.

FIGS. 3 and 4 illustrate a protective assembly developed in accordance with the present invention to protect the insulating flange 20 of a GIS/HPOF cable interface of the type shown in FIG. 1 from transient overvoltages. As in FIG. 1 the insulating flange 20 is sandwiched between the opposed adjacent flanges 18, 19 of the connector assembly 14. The flanges 18, 19 are bolted together by bolts 25 with suitable insulating bushings (not shown). A short metal stub plate 26 is rigidly bolted to the flange 18 so as to end radially outwardly therefrom and a short metal stub plate 27 is rigidly bolted to the flange 19 so as to extend radially outwardly therefrom. Stub plates 26 and 27 are aligned with one another in parallel planes. Stub plates are used to provide the shortest possible current leads to the varistor device 28, yielding a very low self inductance. This improves the performance of the assembly to fast pulses, which may be generated in the GIS and be faster than 1µs rise time. The varistor device 28, consisting of the assembly described with reference to FIG. 2, is clamped between the stub plates 26, 27 with the copper electrode disc 22 in good electric contact with the stub plate 26. Sufficient contact pressure, which can be adjusted as required, is maintained between the copper disc 22 and the stub plate 26 by means of adjustable bolts 29 mounted in the stub plate 27 and bearing on the copper disc 23 of the varistor assembly With the protective arrangement shown in FIGS. 3 and 4 the varistor assembly is connected electrically across the insulating flange but presents a very high resistance to current flow of the order of 100 MΩ at normal operating voltages. In the event of a transient overvoltage greater than the breakdown voltage of the varistor element, the resistance of the varistor elements falls to a very low value thus bypassing the current which would otherwise damage the insulating flange. The breakdown voltage of the varistor is, of course, chosen to be less than the breakdown voltage of the insulating flange.

In order to protect the varistor from extreme conditions and to protect the insulating flange should the varistor fail, a spark gap 33 defined by a pair of spark gap electrodes 30, 31 is arranged across the varistor. The spark gap electrodes consist of a pair of screw-threaded metal rods mounted in the respective stub plates 26, 27 in alignment with one another. The spark gap is readily adjustable, and for operational use is set to break down at a voltage higher than the breakdown voltage of the insulating flange. In a typical installation the spark gap may be set for a pre-breakdown voltage of 10 kV (peak) and the flange may have a breakdown voltage of 20 kV.

High voltage testing of the protective assembly shown in FIGS. 3 and 4 has established that the assembly may not provide adequate protection for all surges owing to the fact that the insulating flange may be damaged by vapourized metal and heat from the spark gap should the latter break down. To deal with this problem two alternative designs were developed. These alternative designs are illustrated in FIGS. 5 and 6 and FIGS. 7 and 8, respectively, and the same reference numerals as have been used in the preceding figures are used to denote corresponding parts.

Figure 5:
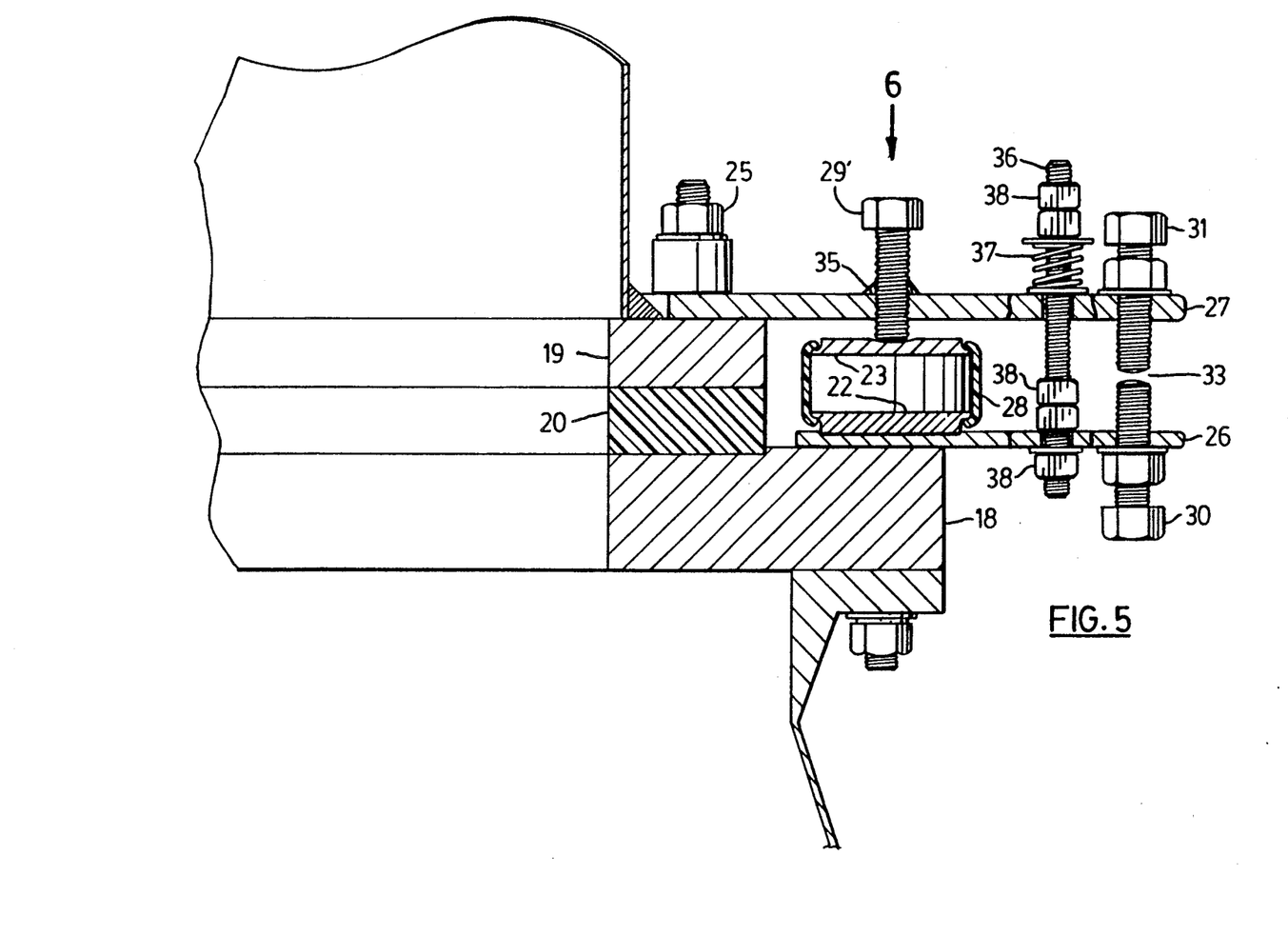
FIG. 5 is a sectional elevational view of a protective assembly according to the invention.
Figure 6:
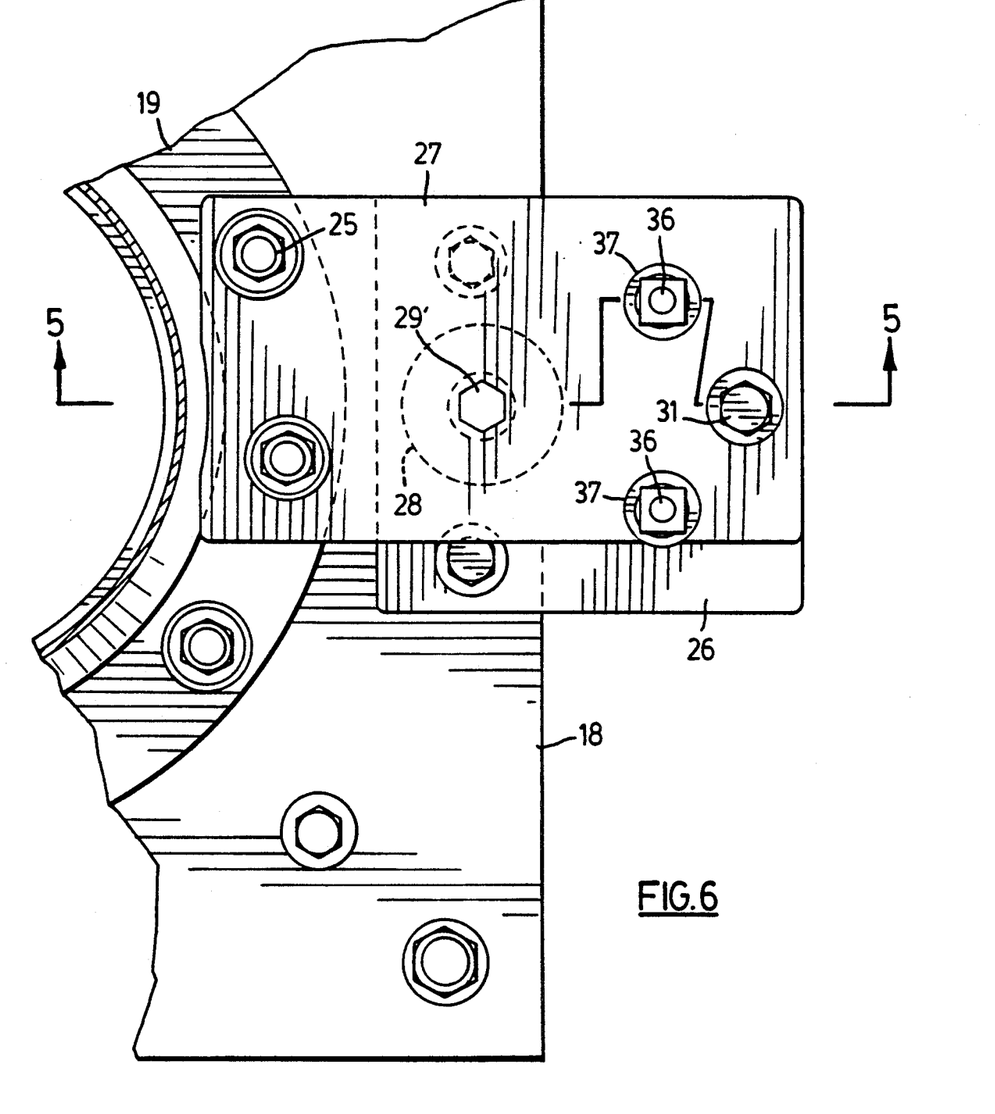
FIG. 6 is a top plan view of FIG. 5.

The first alternative design illustrated in FIGS. 5 and 6 differs primarily from the preceding design in that the spark gap 33 is positioned in radial alignment with the varistor assembly 28, the latter being interposed between the spark gap and the insulating flange and shielding the insulating flange from vapourized metal and heat produced at the spark gap during breakdown and conduction. This has been found to be effective in preventing damage to the insulating flange when arcing occurs. Another feature of this design is that pressure is maintained on the varistor device by a single bolt 29' mounted in the stub plate 27 and fixed in position by an epoxy bond 35, one end of the bolt 29' bearing against the copper disc 23. A pair of insulating rods 36 fixed to the stub plate 26 and extending through openings in the stub plate 27 carry compression springs 37 which bear on the outer face of the stub plate for maintaining pressure on the varistor via the bolt 29'. The five nuts 38 attached to each insulating rod 36 are also made of the same insulating material.

Figure 7:
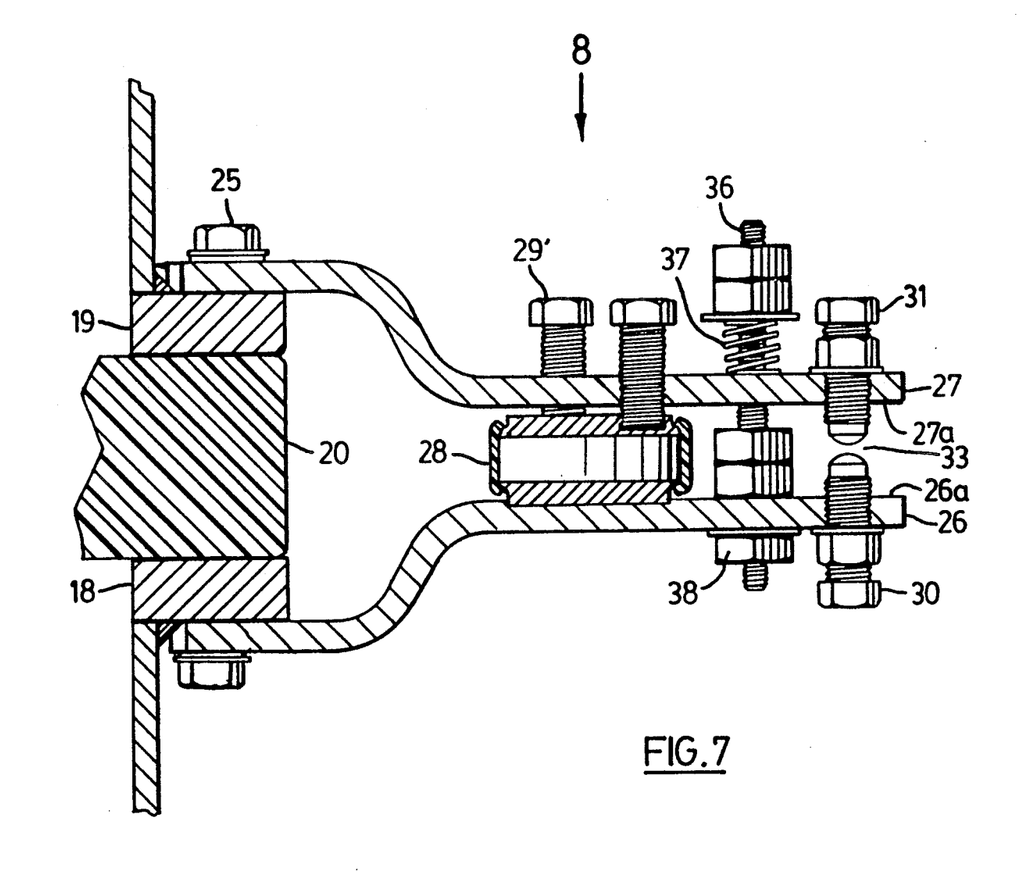
FIG. 7 is a sectional elevational view of a further protective assembly according to the invention.
Figure 8:
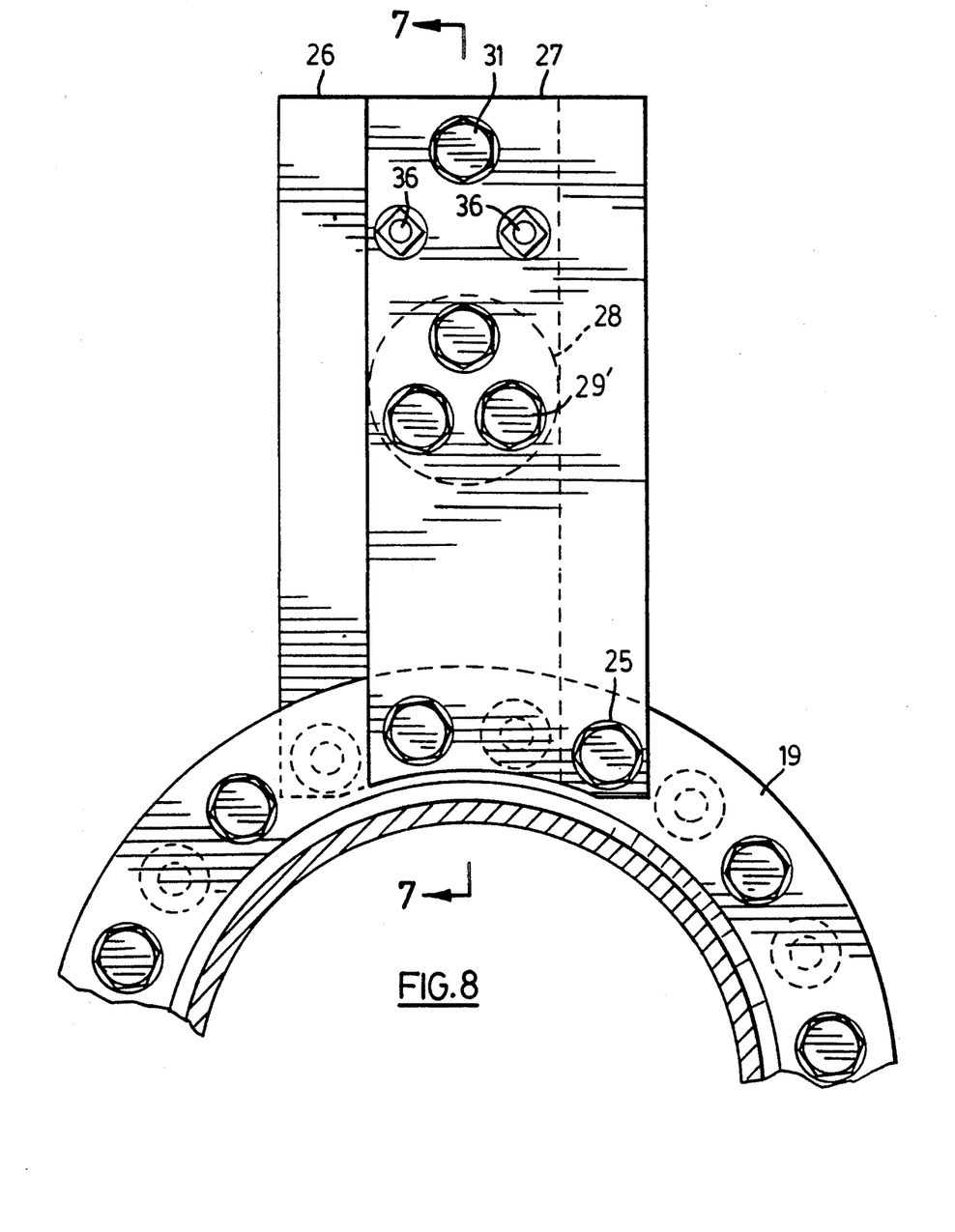
FIG. 8 is a top plan view of FIG. 7.

The second alternative design shown in FIGS. 7 and 8 is essentially similar to that shown in FIGS. 5 and 6, and is similarly characterized by the fact that the spark gap 33 is positioned in radial alignment with the varistor assembly 28 so that the latter will shield the insulating flange 20 from molten metal and heat should arcing occur. The compression springs 37 bearing on the stub plate 27 maintain the necessary pressure on the varistor via the fixed bolts 29'. This design is, however, intended for a higher minimum breakdown voltage than the preceding design as the insulating flange is thicker. As in all the designs the stub plates 26 and 27 are designed so as to provide the shortest possible current leads to the varistor device 28 yielding very low inductance of the leads. Thus, in this embodiment the stub plates 26 and 27 are shaped to provide a pair of superposed parallel planar portions 26a, 27a, the spacing between which is less than the spacing between the flanges 18, 19. The varistor device is clamped between the portions 26a, 27a, and the spark electrodes 30, 31 and the spring-loaded biasing means 36, 37 are mounted on those portions More than one assembly may be mounted on the opposed flanges 18, 19 to protect an insulating flange 20. The version shown in FIG. 6 readily permits mounting four assemblies. The version shown in FIG. 8 permits mounting six assemblies. This increases the energy handling capability and improves the response time of the assemblies to fast pulses.

The spark gap 33 defined by the pair of electrodes 30 and 31 provides adjustments in the coordination of protection of the insulating flange with the varistor. The breakdown voltage of the insulating flange would normally be the withstand voltage. This would be well defined. The breakdown voltage of the varistor is an arbitrary point normally defined as the voltage for currents in the region of 1 mA. The arc gap provides for protection of the varistor which may safely conduct currents up to 50 kA. The gap might be set to fire at voltages corresponding to currents of 10 kA. This would protect the varistor and be well below the breakdown voltage of the insulating flange.

I claim:

1. In combination with an insulating flange of a high voltage power transmission cable system wherein the insulating flange of a grounded metallic enclosure is sandwiched between a pair of independently grounded metal flanges, a surge protection device comprising at least one pair of metal stub plates rigidly attached to the metal flanges and extending radially therefrom in opposed relation to one another, a metal oxide varistor clamped between the stub plates in shunt with the insulating flange, the varistor having a breakdown voltage lower than the breakdown voltage of the insulating flange, and means defining an adjustable spark gap in shunt with the varistor assembly, the spark gap being adjusted to have a breakdown voltage higher than the varistor breakdown voltage but lower than the breakdown voltage of the insulating flange thereby to protect the insulating flange from transient surges should the varistor fail and to protect the varistor from excessive voltages.

2. The combination claimed in claim 1, wherein said means defining an adjustable spark gap are positioned radially outwardly from the varistor in radial alignment therewith.

3. The combination claimed in claim 1, wherein said means defining an adjustable spark gap comprise a pair of opposed electrodes mounted respectively on the stub plates.

4. The combination claimed in claim 1, wherein the varistor comprises a discoid metal oxide varistor element assembled with and sandwiched between a pair of copper discs providing electrical connections to opposed faces of the varistor element.

5. The combination claimed in claim 4, wherein the assembly is encapsulated within an annular sheath of heat shrunk insulating material.

6. In combination with an insulating flange of a high voltage transmission cable system wherein the insulating flange of a grounded metallic enclosure is sandwiched between a pair of independently grounded metal flanges, a surge protection device comprising at least one pair of metal stub plates rigidly attached to the metal flanges and extending radially therefrom in opposed relation to one another; a varistor device clamped between the stub plates and electrically connected thereby in shunt with the insulating flange, the varistor device including at least one metal oxide varistor element having a breakdown voltage lower than the breakdown voltage of the insulating flange; a pair of opposed spark electrodes mounted respectively on the pair of stub plates defining an adjustable spark gap in shunt with the varistor device, the spark gap being adjusted to have a breakdown voltage lower than the breakdown voltage of the insulating flange but higher than the breakdown voltage of the varistor element, said spark electrodes being positioned on the stub plates radially outwardly from the varistor device in radial alignment therewith.

7. The combination claimed in claim 6, further comprising spring-loaded biasing means interconnecting the stub plates for maintaining constant clamping pressure on the varistor device.

8. The combination claimed in claim 7, wherein the stub plates extend radially in parallel planes.

9. The combination claimed in claim 7, wherein the stub plates are shaped to provide a pair of superposed parallel planar portions between which the varistor device is clamped, the spark electrodes and the spring-loaded biasing means being mounted on said planar portions, the spacing between said planar portions being less than the spacing of said independently grounded metal flanges.

10. The combination claimed in claim 7, wherein the varistor device comprises at least one discoid metal oxide varistor element assembled with and sandwiched between a pair of copper discs providing electrical connections to the element.

11. The combination claimed in claim 10, wherein the assembly is encapsulated within an annular sheath of heat shrunk insulating material.

* * * * *